(12) United States Patent
Heim et al.

(10) Patent No.: US 8,690,441 B2
(45) Date of Patent: Apr. 8, 2014

(54) WHEEL BEARING DEVICE FOR MOTOR VEHICLES

(75) Inventors: Jens Heim, Bergrheinfeld (DE);
Christian Mock, Schweinfurt (DE);
Ralf Hund, Boehl-Iggelheim (DE);
Tilman Ulrich, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/562,658

(22) Filed: Jul. 31, 2012

(65) Prior Publication Data

US 2012/0294560 A1 Nov. 22, 2012

Related U.S. Application Data

(62) Division of application No. 12/371,034, filed on Feb. 13, 2009, now abandoned.

(30) Foreign Application Priority Data

Feb. 15, 2008 (DE) .......................... 10 2008 009 283

(51) Int. Cl.
*F16C 32/00* (2006.01)
*F16C 13/00* (2006.01)

(52) U.S. Cl.
USPC ........................... 384/448; 384/544; 384/589

(58) Field of Classification Search
USPC .......... 384/448, 544, 557, 589, 624; 340/438, 340/449, 682
See application file for complete search history.

(56) References Cited

U.S. PATENT DOCUMENTS

| | | | | | |
|---|---|---|---|---|---|
| 3,108,264 | A | * | 10/1963 | Heinoo | 340/682 |
| 5,244,287 | A | * | 9/1993 | Yoshikawa | 384/448 |
| 5,315,954 | A | * | 5/1994 | Richmond | 116/67 R |
| 5,451,869 | A | * | 9/1995 | Alff | 324/173 |
| 5,602,437 | A | * | 2/1997 | Shahamat et al. | 310/90 |
| 5,667,313 | A | * | 9/1997 | Kapaan et al. | 384/544 |
| 5,755,517 | A | * | 5/1998 | Nicot | 384/448 |
| 6,445,099 | B1 | * | 9/2002 | Roseman | 310/90 |
| 6,892,778 | B2 | * | 5/2005 | Hennig et al. | 152/415 |
| 7,652,562 | B2 | * | 1/2010 | White et al. | 340/449 |
| 8,223,006 | B2 | * | 7/2012 | Wilson et al. | 340/449 |

* cited by examiner

*Primary Examiner* — Marcus Charles
*Assistant Examiner* — Adam D Rogers
(74) *Attorney, Agent, or Firm* — Lucas & Mercanti, LLP

(57) ABSTRACT

A wheel bearing device for a motor vehicle, having an inner ring arrangement, formed for rotationally fixed reception of a first rotary partner, particularly an axle stump, or a shaft, an outer ring arrangement, which is connected and/or connectable and rotationally fixed with a second rotary partner, a multitude of rolling elements, which roll between the inner ring arrangement and the outer ring arrangement, so that inner ring arrangement and outer ring arrangement and/or the rotary partners are rotatable against each other, and an electric sensor device, which, using mechanical contact, is arranged and/or formed for detecting an operating status of the wheel bearing device. The sensor device has a stationary sensor element and a rotating sensor element, which can work together to form the mechanical contact. One of the sensor elements is connected with the inner ring arrangement without the interposition of the first rotary partner.

4 Claims, 7 Drawing Sheets

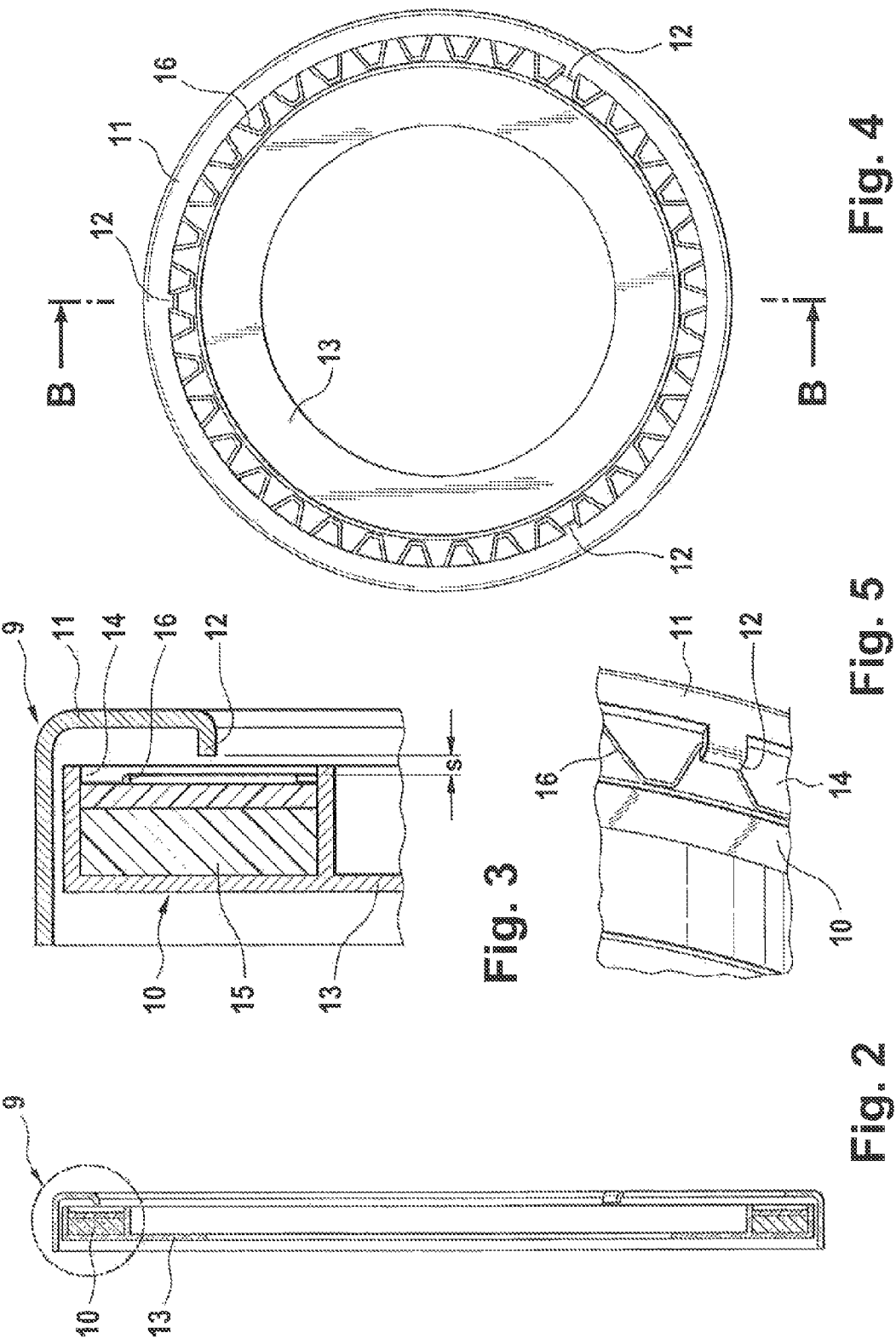

Figure 1B:
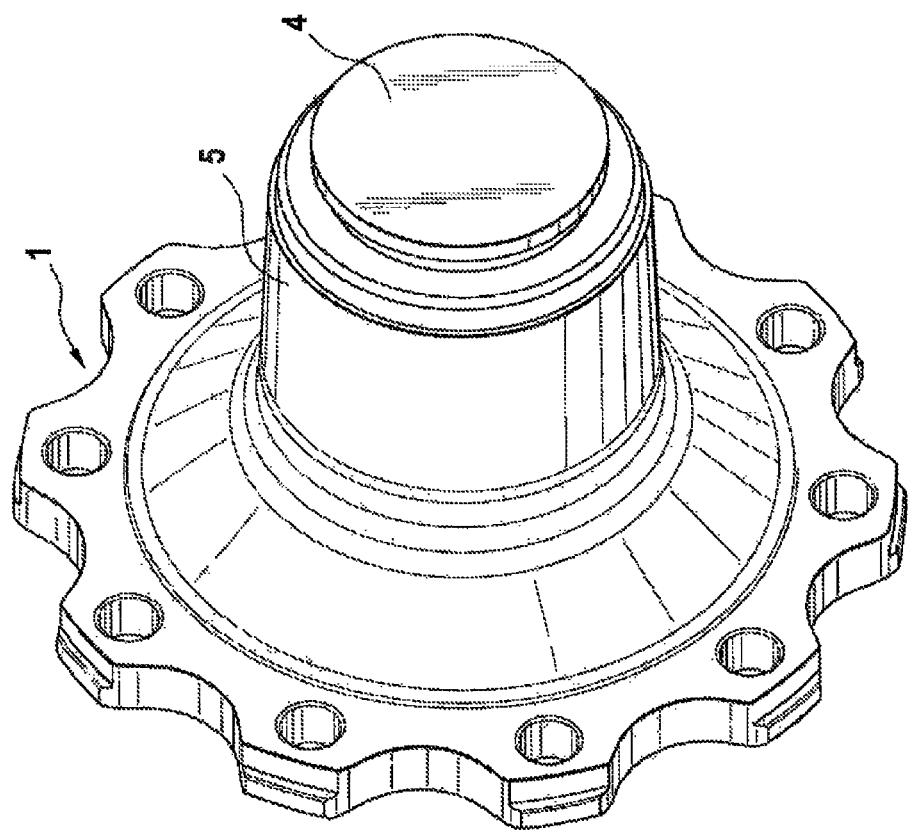

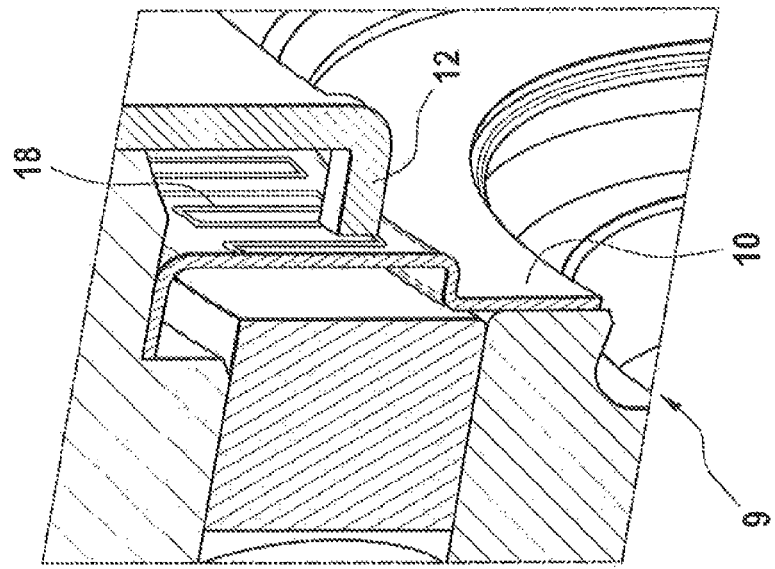
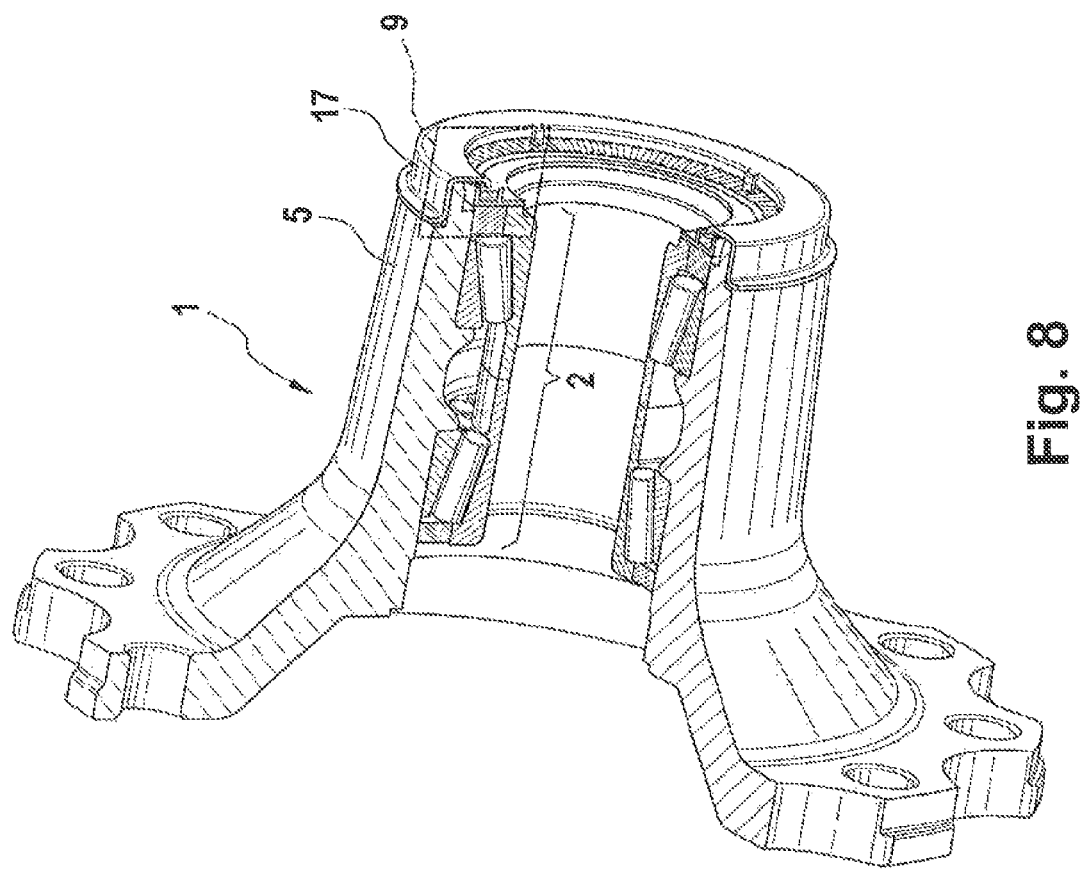
Fig. 8
Fig. 9

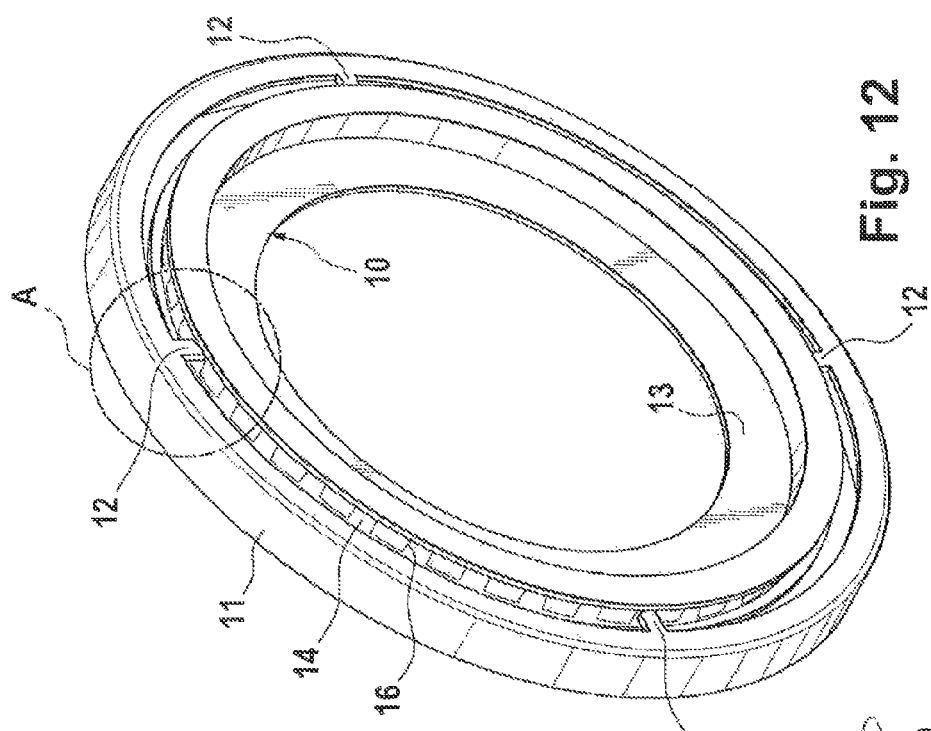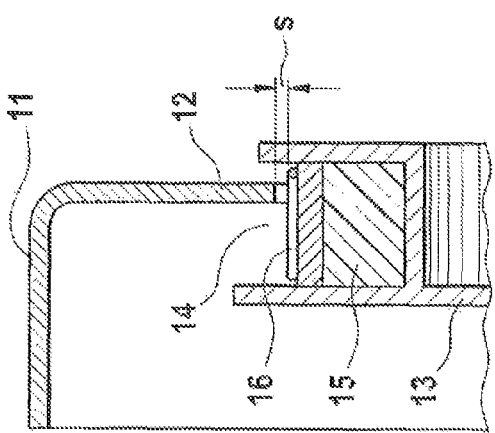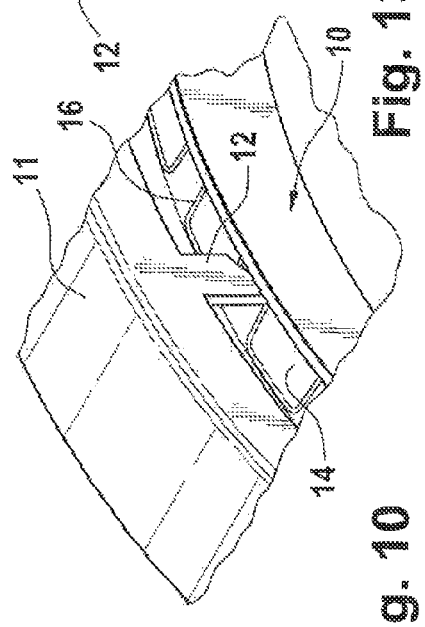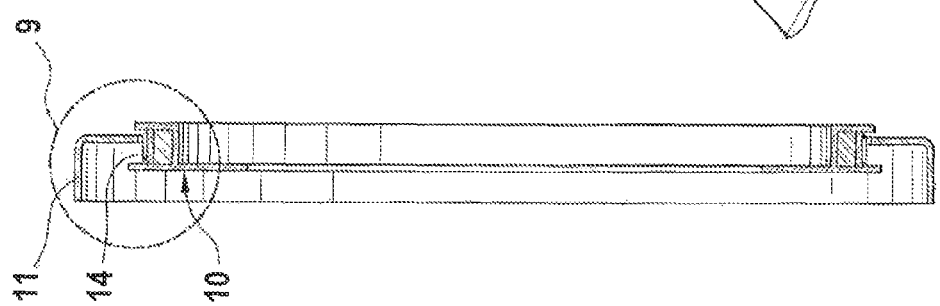

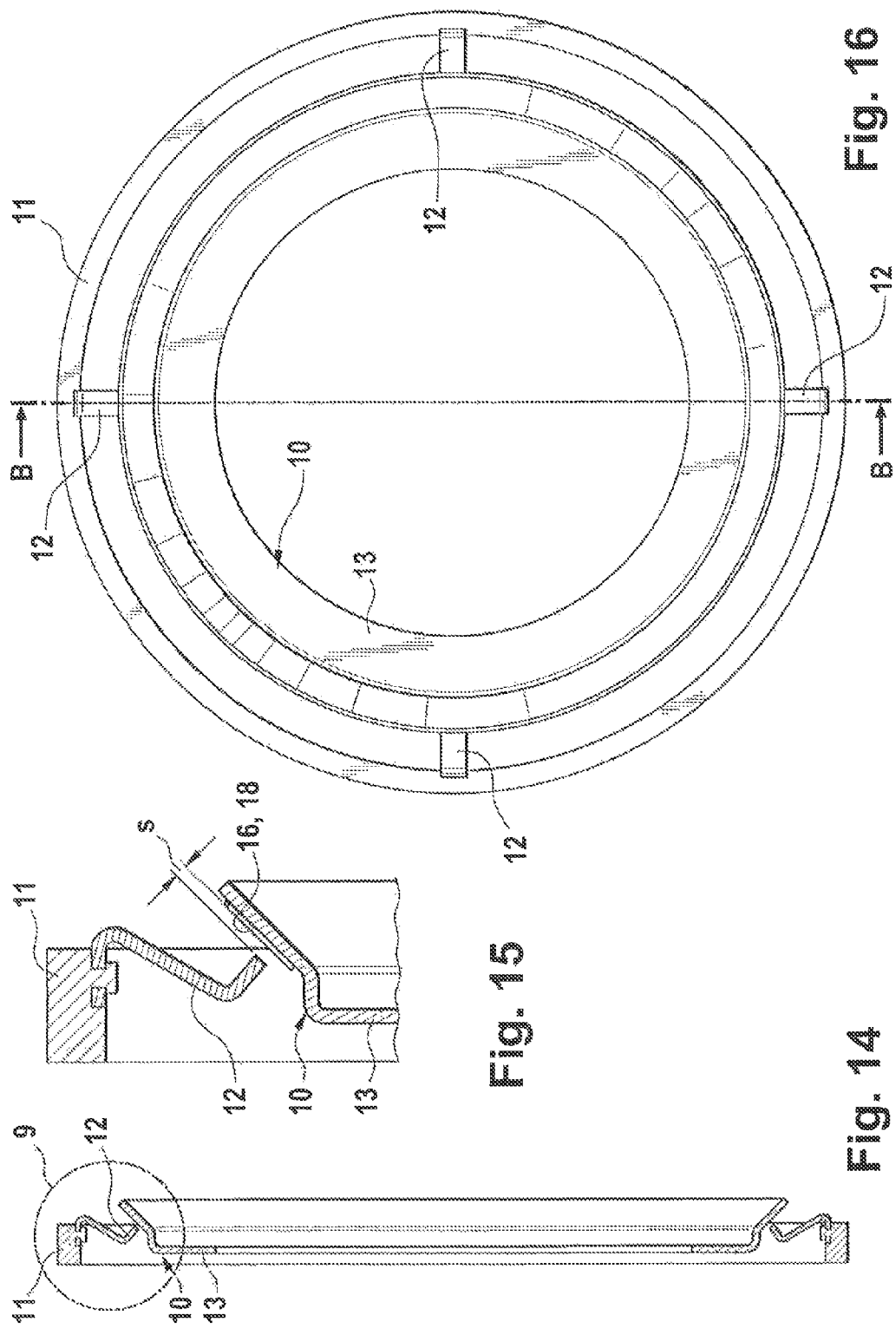

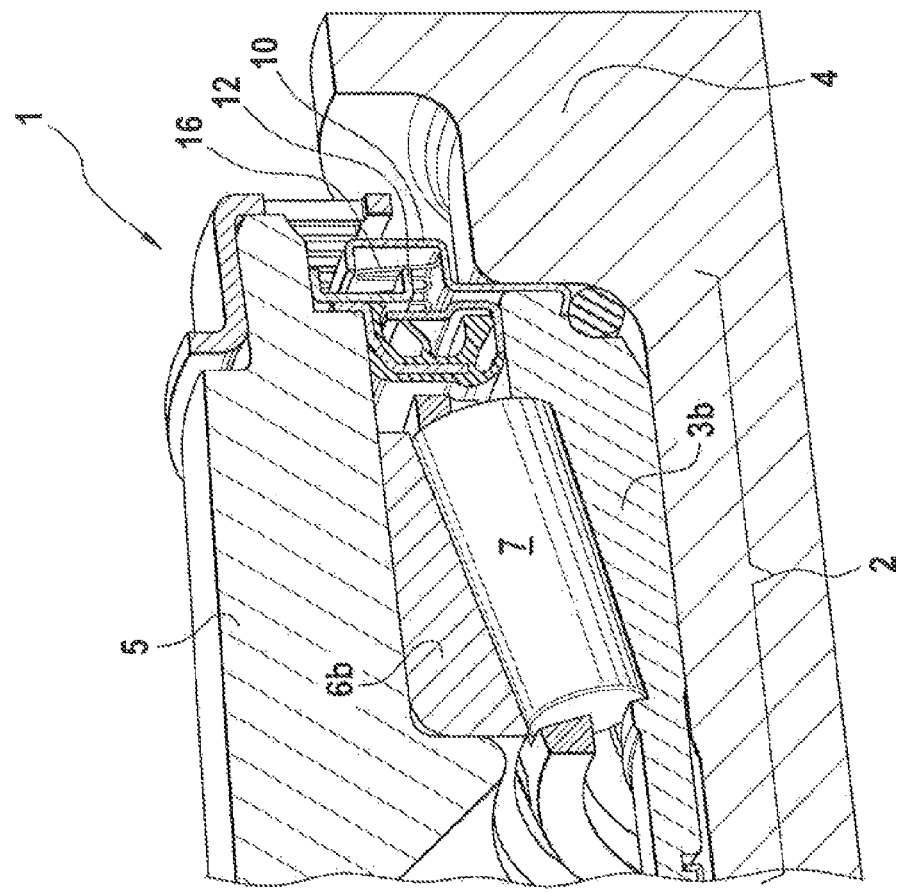
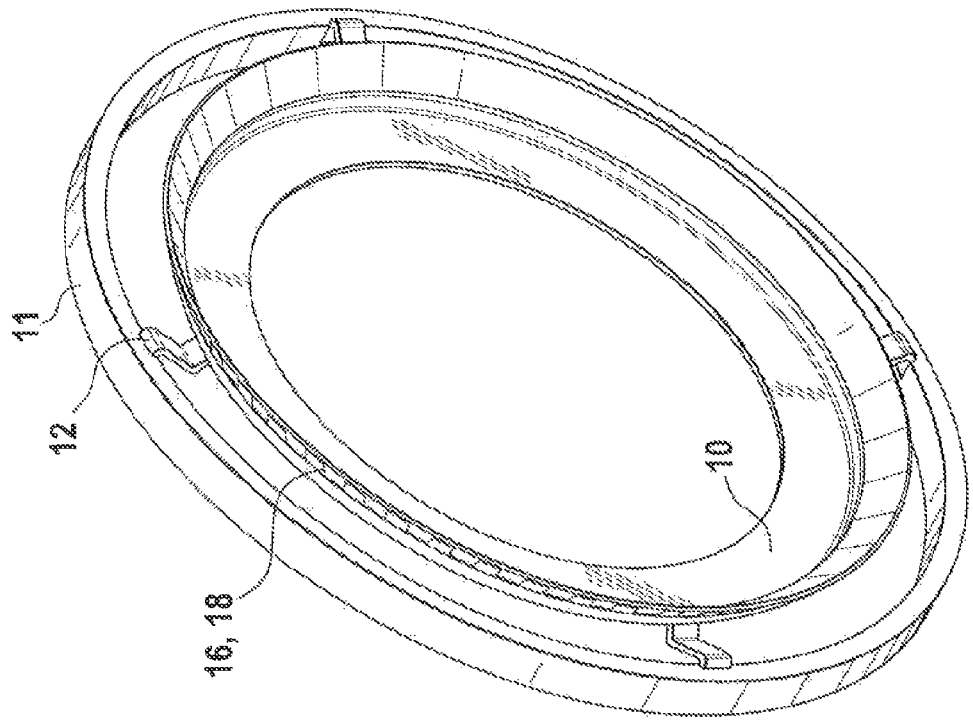

WHEEL BEARING DEVICE FOR MOTOR VEHICLES

CROSS-REFERENCE TO RELATED APPLICATIONS

This application is Divisional of application Ser. No. 12/371,034 filed Feb. 13, 2009, which in turn claims the priority of DE 10 2008 009 2815 filed Feb. 15, 2008, the priority of both applications is hereby claimed and both applications are incorporated by reference herein.

FIELD OF THE INVENTION

The invention concerns a wheel bearing device for a motor vehicle with an inner ring arrangement, which is formed to hold a first rotary partner in a rotationally fixed manner, particularly an axle stump or a shaft, with an outer ring arrangement which is connected and/or connectable with a second rotary partner in a rotationally fixed manner; with a multitude of roiling elements which roll between the inner ring arrangement and the outer ring arrangement, so that the inner ring arrangement and the outer ring arrangement and/or the rotary partners are rotatable against each other, and with an electrical sensor device, which by the use of mechanical contact is arranged and/or designed for detecting an operational state of the wheel bearing device, in which the sensor device contains a stationary sensor part and a rotating sensor part, which can work together to establish the mechanical contact.

Wheel bearing devices are known in a multitude of forms and serve to rotatably bear a wheel on a vehicle. The wheel bearing device usually has at least one anti-friction bearing as a wheel bearing, which allows the turning of the wheel. These ball bearings have a life expectancy appropriate to the application purpose. During normal wear and tear, the end of its life expectancy results in increased operating noises, which are noticed by the driver so that he can have the ball bearing replaced professionally in good time. Although these anti-friction bearings are manufactured and installed to a very high standard of quality, the possibility of them unexpectedly malfunctioning is nevertheless not completely ruled out. In the worst-case scenario, a sudden malfunction of the ball bearing can even lead to losing the wheel. In this case, major consequential damage or even life-threatening situations are to be feared.

With regard to another technical field, namely for example that of monitoring the bearing of the propeller of a water pump, the U.S. Pat. No. 5,244,287, suggests the rotationally fixed attachment of a radially projecting ring on a shaft carrying the propeller and mounted via a ball bearing, which engages with a stationary arranged bracket element, normally without contact. In the case of the ball bearing's impending malfunction the shaft becomes unstable so that the ring initially rests against the inner surfaces of the bracket element and—in the case of increasing instability—mechanically damages the bracket element. This mechanical damage is detected as a break by an electric line running through the bracket element. This break is evaluated and the impending malfunction of the ball bearing is recognised.

Another solution is described in the U.S. Pat. No. 4,063,786, which concerns an error detection device for a main ball bearing of a generator in an airplane. In this error detection device, a disc is set on a rotating shaft, which, in the case of oscillations of the shaft in a radial direction, grinds a stationary positioned contact pin in an outer ring arrangement. As soon as the contact pin, as a result of the wastage, establishes electrical contact with the outer ring arrangement, a signal is activated that warns of the impending malfunctioning of the main ball bearing.

The U.S. Pat. No. 6,445,099 B1, also concerns a bearing control for a generator, in which the shaft mounted via the ball bearing is connected to a propeller. The bearing control is based on a ring, which is placed coaxially to the shaft and provided with a thin conductor layer radially on the inside. The ring is dimensioned or arranged in such a way that the conductor layer is worn through in the case of incorrect radial oscillations of the shaft. As soon as the conductor layer is severed, a signal is generated which warns of a malfunction of the ball bearing.

The U.S. Pat. No. 5,865,543, that arguably presents the nearest state of the art, concerns a detection device for detecting the malfunctioning of a ball bearing of a vehicle, in which the bearing is designed as a wheel bearing. In this patent, the stationary positioning of a tactile sensor on an axle stump or an auxiliary plate and monitoring as distance from a brake drum or a brake disc by means of the tactile sensor is disclosed. If the monitored distance sinks below a threshold value and/or during contact between the tactile sensor and the brake drum or the brake disc, a signal is activated which indicates a possible malfunction of the wheel bearing.

SUMMARY OF THE INVENTION

The invention is based on the task of proposing a wheel bearing device with a wheel bearing monitoring unit, which is designed as cost-effective and unsusceptible to error.

The wheel bearing device according to the invention, designed particularly as a hub unit for a motor vehicle, is suitable for and/or designed for the mounting of a driven or a revolving wheel. It has an inner ring arrangement, Which is designed for the rotationally fixed support of a first rotary partner, above all of an axle stump or a shaft. For example the first rotary partner is pressed into the inner ring arrangement or fixed in another way. The inner ring arrangement can optionally include a first and a second inner ring, which are connected to each other by a coupling element. Especially preferably, the inner ring arrangement is formed by at least one inner ring, which externally forms a track arranged on the inner ring and internally forms direct contact with the first rotary partner.

Alternatively to this, one or several inner ring(s) can be fitted on an inner ring carrying body of the inner ring arrangement.

An outer ring arrangement is connected and/or connectable with a second rotary partner in a rotationally fixed manner. Preferably, the outer ring arrangement has, in particular, an integrally formed outer ring bearing body, in which bearing rings are placed.

Between the inner ring arrangement and outer ring arrangement there are a plurality of rolling members, preferably single-row, two or multi-row, which are formed in particular as tapered rollers. The rolling bodies allow for relative rotation between the inner ring arrangement and the outer ring arrangement or between the two rotary partners, respectively.

For monitoring the working condition of the wheel bearing device, it has an electric sensor device which detects the working condition using mechanical contact. Preferably, the possible working conditions include a normal state of the intact wheel bearing device and/or an emergency state when the wheel bearing device is damaged or subject to malfunctioning. The sensor device presents a stationary sensor part, which is stationary in the vehicle, and a rotating sensor part, which rotates together with the wheel, in which the two sensor parts can work together to form the mechanical contact.

Within the scope of the invention it is proposed that one of the sensor parts, namely without the interposition of the first rotary partner, is connected to the inner ring arrangement in the mounted and/or unmounted state of the wheel bearing device.

One consideration of the invention is to ascertain the possible damaging of the wheel bearing device as close as possible to the damage source to be detected, that is placed in the contact zone outer ring arrangement—rolling body—inner ring arrangement. By the arrangement of one of the sensor parts on or at the inner ring arrangement the significance of the detection by the sensor device is thus increased. Moreover, it is optionally possible to integrate the sensor part on or in the inner ring arrangement already in the production of the wheel bearing device, so that, if compared to the known state of the art, the mounting expenditure is reduced during the final assembly of the wheel bearing device.

Altogether, the invention discloses a wheel bearing device for a motor vehicle with a sensor device, which can detect an imminent malfunction of the wheel bearing, particularly of the ball bearing, with high validity. As will be explained in more detail in the following, the sensor device can react to an axial and/or radial shifting and/or tilting of the inner ring arrangement in relation to the outer ring arrangement. As an optional addition, the sensor device can also respond to an unusual temperature change in the region of the wheel bearing device.

In a preferred improvement of the invention, the other sensor part is connected with the outer ring arrangement. This embodiment emphasizes once more the idea of realizing a simplified mounting and at the same time, higher detection security of the sensor device.

In an optional further development of the idea it is proposed that the wheel bearing device, with the two sensor parts already integrated, is formed as a pre-finished structural element. This further development completely excludes defective mounting during the installation of the sensor device after the installation of the wheel bearing device in the vehicle. Moreover, the sensor device can be set or calibrated in the production of the wheel bearing device.

In a possible constructive realization of the invention, one of the sensor elements presents a functional surface rotating around the rotation axis of the wheel bearing device that is tracked by the other sensor part. In the case of an intact wheel bearing or in the normal state, the other sensor element is distanced from the functional surface by a safety distance. In the case of signs of wear of the wheel bearing or in the emergency state and/or—as will be explained later—in the case of a temperature increase in the area of the wheel bearing device, the safety distance is reduced, and the other sensor element tracks the functional surface with mechanical contact. This reduction of the safety distance can result particularly from a tilting or displacement of the inner ring arrangement in relation to the outer ring arrangement.

Preferably, the functional surface lies in a radial plane in relation to the rotation axis, on a cylindrical surface concentric to the rotation axis or on a conical surface. In other words, the functional surface extends with an angle of 90°, 0° or an intermediate angle of e.g. 45° in relation to the rotation axis of the wheel bearing device.

In a particularly preferred embodiment of the invention, a surrounding electric conductor arrangement is arranged on the functional surface. This conductor arrangement can be formed as an imprinting, a conductor path and/or a conductor wire. The conductor arrangement is preferably undulating, meandering, in a zigzag and/or in another arrangement in the rotating direction, so that the conductor length of the conductor arrangement is greater than the circumference in the area of the conductor arrangement.

In a less preferred embodiment of the invention, the sensor device operates according to a shutter principle, in which, in case of mechanical contact of the sensor elements, a circuit is closed and a signal, as an indication of the wear or an irregularity of the wheel bearing device, is generated. In particular it can be provided that at the mechanical contact, electrical contact between the sensor elements is directly produced, or that first a protecting insulating layer must he removed, before the two sensor elements short out.

In another more preferred embodiment, the sensor device operates according to an opener principle, in which a signal is activated as soon as an or the electric conductor arrangement already described is opened in a or the sensor element. In the preferred embodiment, the conductor arrangement in one of the sensor elements is opened by abrasion by the other sensor element.

The conductor arrangement is formed in this preferred embodiment particularly as a tripwire or a trip conductor.

In a preferred realization of the invention, the one sensor element with an electric conductor arrangement is formed as a sensor ring, which, in a preferred embodiment, is set on the inner ring arrangement. Optionally, the sensor ring is formed as a sealing ring, or integrated into a sealing ring. For example the sealing ring can be formed as a protective or tumbler ring in front of a cassette seal integrated in the wheel bearing device.

In an advantageous embodiment of the invention, the other sensor element is formed as one or more sensor levers, which, in the preferred embodiment and optionally, while using intermediary elements, is mounted and/or fixed on the outer ring arrangement. In modified embodiments of the invention it is also possible that the sensor ring is placed on the outer ring arrangement and the sensor lever on the inner ring arrangement.

In a possible supplement to the invention, it is provided that at least one sensor element is temperature-sensitive or reactive to temperature, so that in the case of a temperature increase over the normal operating temperature of the wheel-bearing device, the safety distance between the sensor elements is reduced and/or that the two sensor elements make mechanical contact.

The sensor device can thus be shift-controlled and temperature-controlled, and an activation of the sensor device electively takes place by tilting the ring arrangements towards one another and/or by a temperature increase. Thus, the sensor device monitors both a mechanical displacement of the inner ring arrangement and the outer ring arrangement towards one another and the temperature of the wheel bearing device. The realization of the temperature sensitivity of the sensor element can be carried out by using a shape memory alloy (SMA). In this respect, a very high strength of the sensor lever(s) as well as the use of complex geometries is possible, since the shape memory alloy is malleable. Another possibility is the use of a bimetallic arrangement, in which metals with different temperature dependencies are connected to each other and, in the case of temperature change, react with a spatial offset. Another possibility is the use of a gas, wax or metal (mercury/gallinstan) filled piston in a cylinder to realize an actuator principle, so that the expansion of the filler leads to a shift of the sensor lever or of the sensor ring. In the case that the temperature sensitivity or dependence is insufficient to diminish the safety distance appropriately, it is optionally proposed to augment a temperature-sensitive shift by means of a lever gear or similar device, so that the sensor lever and/or the sensor ring undergo(es) a sufficient shifting. In this case, by way of the temperature reacting arrangement an actuator is triggered, which, as the sensor lever, contacts the other sensor element mechanically and activates the sensor device.

In one preferred embodiment one of the sensor elements, particularly the other sensor element and in particular the sensor lever, is preferably formed integrally and/or as an integral component of an ABS disc or encoder disc or a seal. These components are already present in the wheel bearing device, so that the integration of the sensor device necessitates only minor modifications of already existing wheel bearing devices.

In case of a particularly preferred constructive realization, the outer ring arrangement is rotating in the installation and the inner ring arrangement is stationary in the vehicle this embodiment, it is preferred that the sensor ring is fixed on the inner ring arrangement and the sensor lever on the outer ring arrangement by means of the ABS disc.

BRIEF DESCRIPTION OF THE INVENTION

Figure 7:
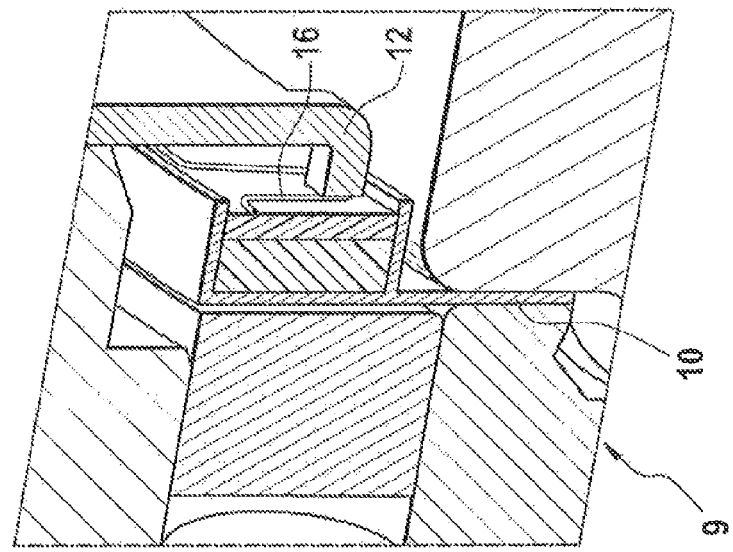
Figure 6:
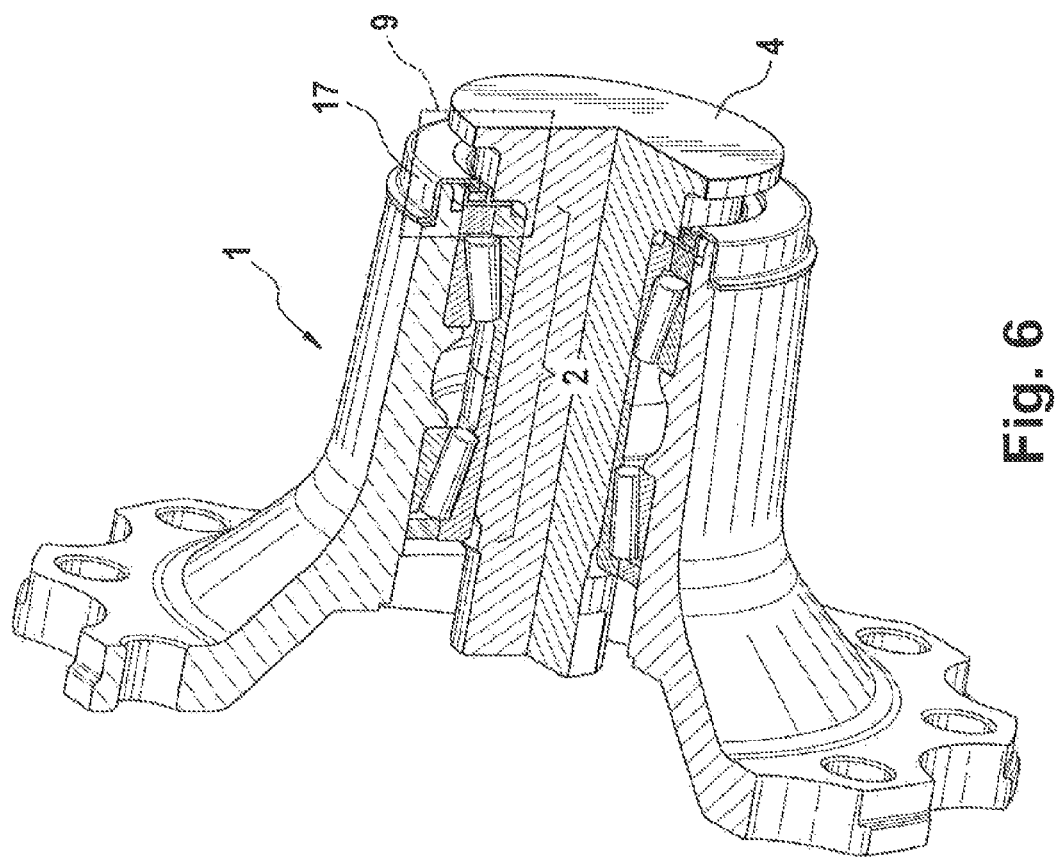

Further features, benefits and effects of the invention result from the following description of preferred embodiments of the invention. The figures show:

FIGS. 1-5 a first embodiment of the invention in various representations;

FIGS. 6, 7 a second embodiment of the invention in various representations;

FIGS. 8, 9 a third embodiment of the invention in various representations;

FIGS. 10-13 a fourth embodiment of the invention in various representations;

FIGS. 14-17 a fifth embodiment of the invention in various representations;

FIG. 18 a sixth embodiment of the invention in a schematic, cut 3D display.

DETAILED DESCRIPTION OF THE INVENTION

Figure 1A:
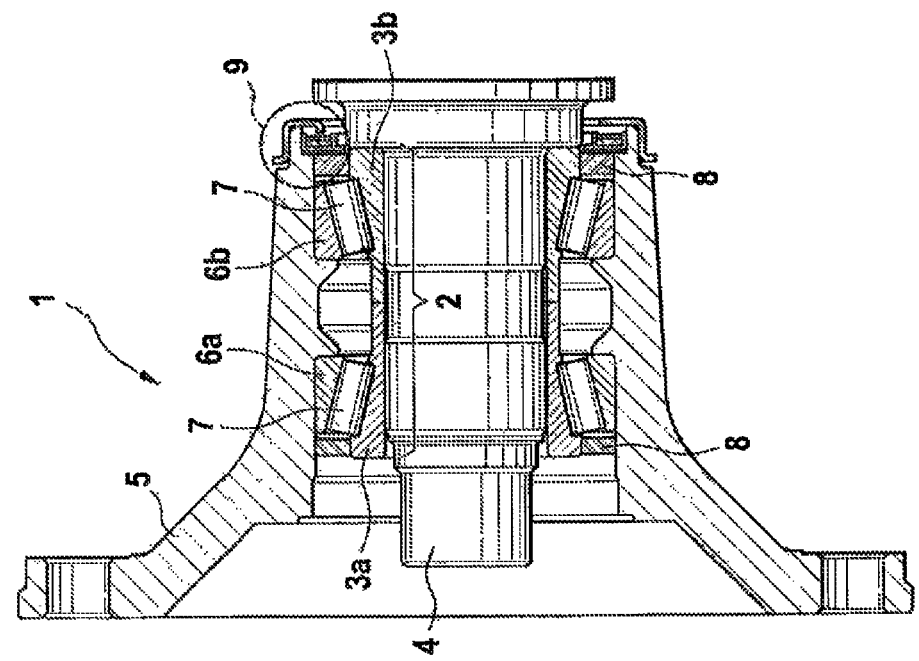

FIGS. 1a, 1b show, in a schematic, a longitudinal section and in a schematic three-dimensional representation, respectively, a wheel bearing device 1 as an embodiment of the invention, which is formed for the rotatable mounting of an undepicted wheel on a vehicle, particularly a commercial vehicle.

The wheel bearing device 1 comprises an inner ring arrangement 2, which comprises inner rings adjacent to each other 3a and 3b in the axial direction. The inner ring arrangement 2, and inner rings 3a, 3b, respectively, contain an axle stump 4 in a rotationally fixed way, which is arranged stationarily in the vehicle or in the wheel suspension.

The wheel bearing device 1 further contains an outer ring arrangement 5, which is connected or connectable and rotationally fixed with the wheel not depicted. In operation, the outer ring arrangement 5 rotates together with the wheel. The outer ring arrangement 5 comprises two inserted outer rings 6a, 6b arranged separate towards one another.

Between the outer rings 6a, 6b and inner rings 3a, 3b rolling bodies 7 are arranged in two rows, which are formed in this example as tapered rollers, however the rolling bodies can also have another form. For sealing against dirt, the wheel bearing device 1 has a cassette seal 8 on both sides.

In order to detect an imminent malfunction, an unusual working condition or damage, the wheel bearing device 1 has a sensor device 9, which is formed as a switch, wherein by opening or closing two sensor elements of the sensor device 9, a circuit is opened or closed.

The mode of operation of the sensor device 9 is based on the fact that a defined distance—in the following also called a safety distance—between a reference point on the outer ring arrangement and a reference point at the inner ring arrangement 2, is observed. More precisely, it is controlled, if this safety distance decreases to or below zero.

Such a reduction of the safety distance can be caused, among other things, by a tilting or shifting of the inner ring arrangement 2 relative to the outer ring arrangement 5 or by a deflection or wear of the wheel bearing device 1. Additionally or alternatively to this, the sensor device 9 can also be temperature sensitive, so that the switch is opened or closed when a determined operating temperature is exceeded.

FIG. 2 shows a schematic longitudinal section through the sensor device 9, in which further components of the wheel bearing, device 1 are not represented. FIG. 3 shows the sensor device 9 in a detailed enlargement. As is shown from a synopsis of FIGS. 1a, 2 and 3, the sensor device is formed by two sensor elements, i.e. a sensor ring 10 and a sensor lever 12, arranged on a cover cap 11.

The sensor ring 10 has a radial fixing section directed inwards 13, which is clamped between the inner ring arrangement 2, particularly the outer inner ring 3b and the axle stump 4, or is directly fixed on the inner ring arrangement. As the fixing section 13 is in direct contact with the inner ring 3b or the inner ring arrangement 2, its position is defined with maximum precision. Radially outwards, the sensor ring 10 has a U-shaped receptacle 14 opened in the axial direction, in which first plastic layers 15 and—at the open side—a tripwire 16 are arranged. As is shown best in FIG. 4, the tripwire 16 is formed as a continuous wire, however partially covered in the representation, which extends in a regular pattern in the rotational direction around the rotation axis of the wheel bearing device 1. It is, furthermore, particularly advantageous for the sensor ring 10 to take up a double function, it is also formed as a sealing ring 19 for the protection of the cassette seal 8 in addition to the sensor function. The sensor lever 12 is formed as a free projection on the cover cap 11, pointing axially inwards, while—as also shown in FIG. 4—several sensor levers 12 are distributed equidistant in the rotational direction.

Both the sensor ring 10 and the cover cap 11 and thus the sensor lever 12, by resting directly against the outer ring arrangement 5 or the inner ring arrangement 2, are defined very accurately in their position, so that in the case of an intact state of the wheel bearing device 1, a safety distance (s) is formed between the tripwire 16 and the free end of the sensor lever 12.

In the case that the outer ring arrangement 5 and inner ring arrangement 2 tilt towards one another or shift towards one another, the safety distance (s) reduces until mechanical contact between the sensor levers 12 and the tripwire 16 arises. If the safety distance (s) diminishes further, the sensor lever 12 erodes the tripwire 16 at least sectionally, so that its conductivity is interrupted.

The conductivity of the tripwire 16 is permanently monitored, so that on the one hand, the correct operability of the sensor device 9 is controllable and on the other hand, a cutting of the tripwire 16 by the sensor lever 12 is immediately detectable. As soon as such damage is detected, an alert signal is issued to the driver meaning that the wheel bearing device 1 is defective or no longer in sufficient working condition.

In a further embodiment of the invention not shown, it can additionally be provided that the sensor lever 12 is formed and/or arranged as temperature-sensitive, so that with increasing temperature safety distance (s) is reduced, The design of the sensor lever 12 is selected so that, if a temperature limit is reached, the safety distance (s) is reduced and, in an analogous way, as in the case of tilting or shifting, the tripwire 16 is eroded and its conductivity is interrupted. Thus, in this improvement, the sensor device 9 is both sensitive to shifts and to temperature increases of the wheel bearing device 1.

As an alternative to this embodiment, the tripwire 16 can also, in its course, have at least one temperature-sensitive section, which reacts as soon as a temperature limit is exceeded. The reaction of the temperature-sensitive section is fulfilled preferably by a temperature sensitive sensor element. In this way, the tripwire 16 occupies another function, namely as a signal line for the temperature sensitive sensor element.

In modified embodiments of the invention it is also possible that the sensor lever 12 does not, as illustrated in FIG. 1a, engage from the free axial side in the sensor ring 10, but is arranged protected and is in the internal space of the wheel bearing device 1 and abuts from the inner side against an inversely formed sensor ring 10 (compare also FIG. 18).

FIG. 5 shows a schematic three-dimensional representation of the section in FIG. 3, in which it can be seen how the sensor lever 12, which is arranged integrally on the cover cap 11, engages in the seat 14 of the sensor ring 10 in order to detach the tripwire 16.

FIGS. 6 and 7 show another embodiment of the invention, in which equal reference signs indicate the same parts as in the preceding Figures. In a differentiation from the embodiment in the FIGS. 1 to 5, even though the sensor ring 10 is embodied similar or identical in the second embodiment of FIGS. 6 and 7, the sensor levers 12 are not, however, an integral component of a cover cap 11, but are formed integrally on an ABS disc or encoder disc 17, In this embodiment, correspondingly, the mounting for the sensor lever 12 also has another function, i.e. as encoder disc 17.

As shown particularly in FIG. 6, the ABS disc 17 rests directly on a carrying body of the outer ring arrangement 5, so that—as in the preceding figures—a high positioning accuracy of the sensor lever 12 is reached.

FIGS. 8 and 9 show a modified embodiment of the second embodiment in the FIGS. 6 and 7, in which, unlike the preceding embodiment, the sensor ring 10 comprises a printed conductor path 18 instead of the tripwire 16, but which is built and functions in an analogous way as the tripwire 16.

The preceding embodiments showed the detection of tilting/shifting and/or a temperature change of the wheel bearing device 1 by a displacement of the sensor lever 12 in relation to the sensor disc 10 in an axial direction. FIGS. 10 to 13, on the other hand, illustrate a sensor device 9 with a sensor lever 12, which affects the tripwire 16 in the radial direction as another embodiment of the invention.

FIG. 10 shows a longitudinal section through the sensor disc 10 as well as a cover cap 11, which differentiate from the embodiment in the FIGS. 2 and 3 substantially by the fact that the seat 14 of the sensor disc 10 is radially open towards the outside and the tripwire 16 constitutes a functional surface, which is arranged in a cylinder surface form and concentrically to the rotation axis of the wheel bearing device 1.

In FIG. 11, which shows a detailed enlargement of FIG. 10 it can be seen that the safety distance (s) is arranged in a radial direction this time. FIGS. 12 and 13 show the sensor device 9 in a three-dimensional representation and in a detailed representation of the detail 1 in FIG. 12, in which it can be seen that four sensor levers 12 engage in a radial direction into the seat 14 of the sensor disc 10.

The FIGS. 14 to 17 show a further embodiment of the invention, in which the sensor ring 10 with the tripwire 16, in differentiation from the preceding embodiments, constitute a functional surface, which is conically designed and occupies an angle of approximately 45° in relation to the rotation axis of the wheel bearing device 1. The sensor lever 12 is formed as a separate component, which is integrated into a cover cap 11, this embodiment offering the option for the sensor lever 12 to be formed of temperature sensitive material, so that in the case of a temperature increase, the safety distance s between the free end of the sensor lever 12 and the functional surface of the sensor ring 10 or the tripwire 16 is reduced. FIG. 17 shows the fourth embodiment in a three-dimensional representation.

The next embodiment in FIG. 18 is formed in a similar way as the first embodiment, in which the sensor ring 10, on its radial inner area, comprises a collar shaped molding, which encompasses the inner ring 3b positively, so that a form-fit fixing of the sensor ring 10 on the inner ring 3b is ensured. Generally, it is preferred that the sensor ring 10 or the sensor element is undetachably fixed on the inner ring arrangement 2. Thus, this fixing of the sensor ring 10 can also be used in the other embodiments. The sensor lever 12 engages—as mentioned before—not from axially outside, but laterally from the inside of the wheel bearing device 1 into a seat 14 of the sensor disc.

The invention claimed is:

1. A wheel bearing device for a motor vehicle, comprising:
an inner ring arrangement, which is formed for rotationally fixed reception of a first rotary partner;
an outer ring arrangement, which is connectable with a second rotary partner in a rotationally fixed manner;
a multitude of rolling elements, which roil between the inner ring arrangement and the outer ring arrangement so that the inner ring arrangement and the outer ring arrangement and/or the first rotary partner and the second rotary partner are rotatable against each other;
an electric sensor device, which, using a mechanical contact for detecting a working condition of the wheel bearing device, comprises a stationary sensor element and a rotating sensor element which together form the mechanical contact, wherein the stationary sensor element is connected with the inner ring arrangement without interposition of the first rotary partner; and
the stationary sensor element including an electric conductor arrangement, wherein the sensor device operates according to an opener principle, in which a signal is activated as soon as the electric conductor arrangement is opened in the stationary sensor element,
wherein the stationary element comprises a functional surface surrounding a rotation axis of the wheel bearing device, the rotating sensor element faces the functional surface and rotates along, a circular path, and the electric conductor arrangement is arranged on the functional surface and extends circumferentially in an undulating pattern along the functional surface.

2. The wheel bearing device according to claim 1, wherein the functional surface is tracked in operation by the rotating sensor element distanced with a safety distance or with the mechanical contact.

3. The wheel bearing device according to claim 2, wherein the functional surface is arranged on one of a radial plane in relation to the rotation axis of the wheel bearing device and a conical surface arranged concentrically in relation to the rotation axis of the wheel bearing device.

4. The wheel bearing device according to claim 1, wherein the rotating sensor element includes a cover cap connected to the outer ring arrangement and a sensor lever comprising a projection having a free end facing the functional surface.

* * * * *